(12) United States Patent
Lin et al.

(10) Patent No.: US 12,228,765 B2
(45) Date of Patent: Feb. 18, 2025

(54) CURVED OPTICAL PLATE AND METHOD OF MANUFACTURING THE SAME, BACKLIGHT MODULE AND DISPLAY DEVICE

(71) Applicants: Fuzhou BOE Optoelectronics Technology Co., Ltd., Fujian (CN); BOE TECHNOLOGY GROUP CO., LTD., Beijing (CN)

(72) Inventors: Yuhang Lin, Beijing (CN); Zhiying Chen, Beijing (CN); Chengkun Liu, Beijing (CN); Han Zhang, Beijing (CN); Hongyu Zhao, Beijing (CN); Ming Chen, Beijing (CN); Zhijie Guo, Beijing (CN); Lian Fang, Beijing (CN); Long Hu, Beijing (CN); Ting Cui, Beijing (CN); Liangliang Ren, Beijing (CN); Kai Diao, Beijing (CN)

(73) Assignees: FUZHOU BOE OPTOELECTRONICS TECHNOLOGY CO., LTD., Fujian (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/027,294

(22) PCT Filed: Jun. 29, 2022

(86) PCT No.: PCT/CN2022/102562
§ 371 (c)(1),
(2) Date: Mar. 20, 2023

(87) PCT Pub. No.: WO2024/000334
PCT Pub. Date: Jan. 4, 2024

(65) Prior Publication Data
US 2024/0210614 A1  Jun. 27, 2024

(51) Int. Cl.
*F21V 8/00* (2006.01)
(52) U.S. Cl.
CPC ......... *G02B 6/0093* (2013.01); *G02B 6/0065* (2013.01); *G02B 6/0068* (2013.01);
(Continued)
(58) Field of Classification Search
CPC .... G02B 6/002; G02B 6/0045; G02B 6/0058; G02B 6/0065; G02B 6/0081;
(Continued)

(56) References Cited

U.S. PATENT DOCUMENTS

| 5,808,708 | A | * | 9/1998 | Oyama | ............. | G02B 6/0018 |
| | | | | | | 362/621 |
| 7,690,831 | B2 | * | 4/2010 | Mori | ................. | G02B 6/0013 |
| | | | | | | 362/621 |

(Continued)

FOREIGN PATENT DOCUMENTS

| CN | 103823321 A | 5/2014 |
| CN | 205015588 U | 2/2016 |

(Continued)

*Primary Examiner* — Keith G. Delahoussaye
(74) *Attorney, Agent, or Firm* — IP & T GROUP LLP (57) ABSTRACT

A curved optical plate includes a curved light exit surface including at least one curved edge and at least one uncurved edge, and at least one first side surface connected to the at least one uncurved edge of the light exit surface; a first side surface includes a first surface, and the first surface extends toward an interior of the curved optical plate.

13 Claims, 9 Drawing Sheets

(52) U.S. Cl.
CPC ......... *G02B 6/0081* (2013.01); *G02B 6/0088* (2013.01); *G02B 6/002* (2013.01); *G02B 6/0045* (2013.01); *G02B 6/0058* (2013.01)

(58) Field of Classification Search
CPC ............. G02B 6/0093; G02F 1/133314; G02F 1/133317; G02F 1/133524
See application file for complete search history.

(56) References Cited

U.S. PATENT DOCUMENTS

| | | | | |
|---|---|---|---|---|
| 2010/0226146 | A1* | 9/2010 | Cho | G02B 6/0016 |
| | | | | 362/623 |
| 2010/0246208 | A1* | 9/2010 | Iwasaki | G02B 6/0073 |
| | | | | 362/582 |
| 2012/0261682 | A1* | 10/2012 | Zhang | G02B 6/0018 |
| | | | | 257/89 |
| 2013/0114293 | A1* | 5/2013 | Morino | G02B 6/002 |
| | | | | 362/608 |
| 2013/0258710 | A1* | 10/2013 | Huang | G02F 1/133608 |
| | | | | 362/609 |
| 2014/0022816 | A1* | 1/2014 | Iwasaki | G02B 6/0016 |
| | | | | 362/606 |
| 2014/0133184 | A1* | 5/2014 | Zhou | G02B 6/0061 |
| | | | | 362/628 |
| 2014/0160778 | A1* | 6/2014 | Nakada | B60Q 1/2607 |
| | | | | 362/511 |
| 2014/0211493 | A1* | 7/2014 | Ichikawa | F21V 7/0025 |
| | | | | 362/511 |
| 2014/0307472 | A1* | 10/2014 | Tseng | G02B 6/0038 |
| | | | | 362/626 |
| 2017/0123129 | A1* | 5/2017 | Zheng | G02B 6/0043 |
| 2018/0217445 | A1* | 8/2018 | Zheng | G02B 6/005 |
| 2019/0049088 | A1* | 2/2019 | Sakashita | G02B 6/002 |
| 2019/0196082 | A1* | 6/2019 | Jeong | G02B 6/0065 |
| 2019/0309919 | A1* | 10/2019 | Tanoue | F21S 43/40 |
| 2020/0025995 | A1* | 1/2020 | Mori | G02B 6/0018 |

FOREIGN PATENT DOCUMENTS

| | | |
|---|---|---|
| CN | 205787490 U | 12/2016 |
| CN | 108181756 A | 6/2018 |
| CN | 207992499 U | 10/2018 |
| CN | 109164519 A | 1/2019 |
| CN | 109212661 A | 1/2019 |
| CN | 209248067 U | 8/2019 |
| CN | 209946440 U | 1/2020 |
| JP | 2017-181819 A | 10/2017 |
| KR | 10-1586795 B1 | 1/2016 |

* cited by examiner

FIG. 1

(PRIOR ART)

CURVED OPTICAL PLATE AND METHOD OF MANUFACTURING THE SAME, BACKLIGHT MODULE AND DISPLAY DEVICE

CROSS-REFERENCE TO RELATED APPLICATION

This application is a national phase entry under 35 USC 371 of International Patent Application No. PCT/CN2022/102562, filed on Jun. 29, 2022, which is incorporated herein by reference in its entirety.

TECHNICAL FIELD

The present disclosure relates to the field of display technologies, and in particular, to a curved optical plate and a method of manufacturing the same, a backlight module and a display device.

BACKGROUND

With continuous innovations of display technologies, display devices have been rapidly developed towards directions of thin body, narrow bezel and light weight. A display device with a narrow bezel has a relatively high screen-to-body ratio, which can bring good visual experience to users.

SUMMARY

In an aspect, a curved optical plate is provided. The curved optical plate includes a light exit surface and at least one first side surface. The light exit surface is a curved light exit surface, and the curved light exit surface includes at least one curved edge and at least one uncurved edge. The at least one first side surface is connected to the at least one uncurved edge of the light exit surface. A first side surface includes a first surface, and the first surface extends toward an interior of the curved optical plate.

In some embodiments, the first surface is in a shape of a plane. An included angle between the first surface and a tangent plane where an uncurved edge connected to the first side surface is located is less than 90°.

In some embodiments, the first surface is in a shape of a curved surface. The curved surface protrudes towards a direction away from the light exit surface. Alternatively, the curved surface protrudes towards a direction proximate to the light exit surface.

In some embodiments, the first side surface further includes a second surface, and the second surface is connected to the first surface and the light exit surface.

In some embodiments, the second surface extends toward the interior of the curved optical plate.

In some embodiments, the curved optical plate further includes a bottom surface, and the bottom surface is opposite to the light exit surface. The first side surface further includes a third surface, and the third surface is connected to the bottom surface and the first surface.

In some embodiments, the third surface extends toward the interior of the curved optical plate.

In some embodiments, the curved optical plate further includes at least one second side surface connected to the curved edge of the light exit surface, and a second side surface includes another first surface.

In some embodiments, the curved optical plate is a light guide plate or a diffuser plate.

In another aspect, a backlight module is provided. The backlight module includes a backboard, a light source and a curved optical plate. The backboard includes a bottom plate and a surrounding plate that extends from an edge of the bottom plate to a side of the bottom plate. The bottom plate and the surrounding plate define an accommodation space. The light source is located in the accommodation space. The curved optical plate is located in the accommodation space; a light incident surface of the curved optical plate faces the light source. The curved optical plate includes a curved light exit surface including at least one curved edge and at least one uncurved edge, and at least one first side surface connected to the uncurved edge of the light exit surface. A first side surface includes a first surface, and the first surface extends towards an interior of the curved optical plate.

In some embodiments, an orthographic projection of the first surface on the bottom plate is at least partially located within an orthographic projection of the light exit surface on the bottom plate.

In some embodiments, the curved optical plate further includes a bottom surface; the bottom surface of the curved optical plate is opposite to the light exit surface, and an orthographic projection of the bottom surface on the bottom plate is located within an orthographic projection of the light exit surface on the bottom plate.

In some embodiments, the curved optical plate further includes at least one second side surface connected to the curved edge of the light exit surface, and a second side surface includes another first surface.

In some embodiments, the backlight module is an edge-lit backlight module. The light source is located between the curved optical plate and the surrounding plate. The first side surface is the light incident surface, and/or the second side surface is the light incident surface; the light incident surface is opposite to the light source.

In some embodiments, the curved optical plate is a light guide plate. The backlight module further includes a reflective film; the reflective film covers the bottom surface of the light guide plate, and an area of the reflective film is less than an area of the light exit surface.

In some embodiments, the backlight module is a direct-lit backlight module. The light source is located between the curved optical plate and the bottom plate. The curved optical plate further includes a bottom surface opposite to the light exit surface, and the bottom surface is the light incident surface and is opposite to the light source.

In yet another aspect, a display device is provided. The display device includes a backlight module and a display panel located on a light exit side of the backlight module. The backlight module is the backlight module as described above.

In another aspect, a method of manufacturing a curved optical plate is provided. The method of manufacturing the curved optical plate includes: providing an initial optical plate; and processing the initial optical plate to form the curved optical plate. The curved optical plate includes a light exit surface, and at least one first side surface connected to at least one uncurved edge of the light exit surface. A first side surface includes a first surface, and the first surface extends towards an interior of the curved optical plate.

In some embodiments, processing the initial optical plate to form the curved optical plate includes: bending the initial optical plate, so as to form a first transition optical plate having a concave surface; and removing at least a portion, located outside the concave surface of the first transition optical plate, of an end of the first transition optical plate, so as to form the curved optical plate having the first surface.

In some embodiments, processing the initial optical plate to form the curved optical plate includes: removing at least a portion, proximate to a first side, of an end of the initial optical plate, so as to form a second transition optical plate having the first surface; and bending the second transition optical plate, so as to form the curved optical plate. The first surface is located outside a concave surface of the curved optical plate; a convex surface of the curved optical plate faces the first side.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, depending on the context, the phrase "if it is determined that" or "if [a stated condition or event] is detected" is optionally construed as "in a case where it is determined that", "in response to determining that", "in a case where [the stated condition or event] is detected", or "in response to detecting [the stated condition or event]".

Additionally, the phase "based on" as used herein is meant to be open and inclusive, since a process, a step, a calculation or other action that is "based on" one or more of stated conditions or values may, in practice, be based on additional conditions or values beyond those stated.

As used herein, the term such as "parallel", "perpendicular" or "equal" includes a stated condition and a condition similar to the stated condition, a range of the similar condition is within an acceptable range of deviation, and the acceptable range of deviation is determined by a person of ordinary skill in the art, considering measurement in question and errors associated with measurement of a particular quantity (i.e., limitations of a measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of the approximate equality may be that, for example, a difference between the two that are equal is less than or equal to 5% of either of the two.

Exemplary embodiments are described herein with reference to sectional views and/or plan views as idealized exemplary drawings. In the accompanying drawings, thicknesses of layers and sizes of regions are enlarged for clarity. Thus, variations in shape relative to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown in a rectangular shape generally has a feature of being curved. Therefore, the regions shown in the accompanying drawings are schematic in nature, and their shapes are not intended to show actual shapes of regions in a device, and are not intended to limit the scope of the exemplary embodiments.

With the continuous improvements in pursuits of users, a curved display can bring better experience to the users visually than a flat display in a case where sizes of display screens of the two are the same. However, in a case where a display screen of a liquid crystal display is in a state of being curved, a shape of an optical film such as a light guide plate of a backlight module is changed accordingly.

Figure 1:
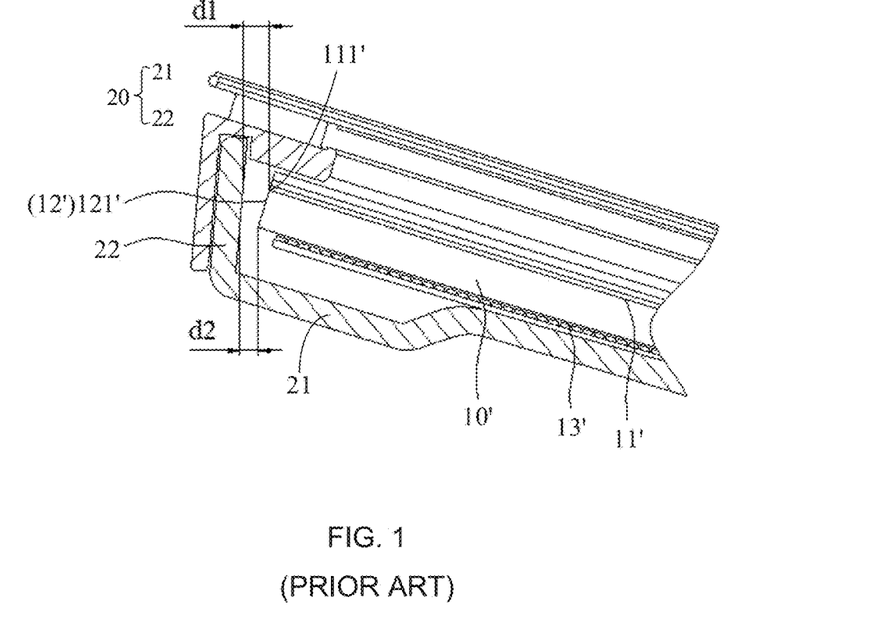
FIG. 1 is a sectional view of a display device, in accordance with the related art.

As shown in FIG. 1, in some examples, the backlight module includes a backboard 20 and a curved optical plate 10'. The curved optical plate 10' is located in an accommodation space of the backboard 20. The curved optical plate 10' includes a light exit surface 11' and a bottom surface 13' that are opposite to each other, a distance between an edge of the light exit surface 11' and the backboard 20 is represented as d1, and a distance between the bottom surface 13' and the backboard 20 is represented as d2. At a high temperature, the curved optical plate 10' expands to be in contact with an inner wall of the backboard 20, which causes a damage to the optical film. In order to protect the optical film, the backlight module is provided with a space, in which the optical film is allowed to expand, between a bezel and the optical film.

As for a curved light guide plate in the curved display, since the light guide plate has a relatively large thickness, a side wall of the curved light guide plate expands outwards relative to the light exit surface. Thus, a distance between the light exit surface of the light guide plate and the bezel is increased, thereby increasing a width of the bezel of the display device. As a result, it is not conducive to achieving a narrow bezel of the display device.

In light of this, some embodiments of the present disclosure provide a curved optical plate and a method of manufacturing the same, a backlight module and a display device, which will be respectively described below.

Figure 2:
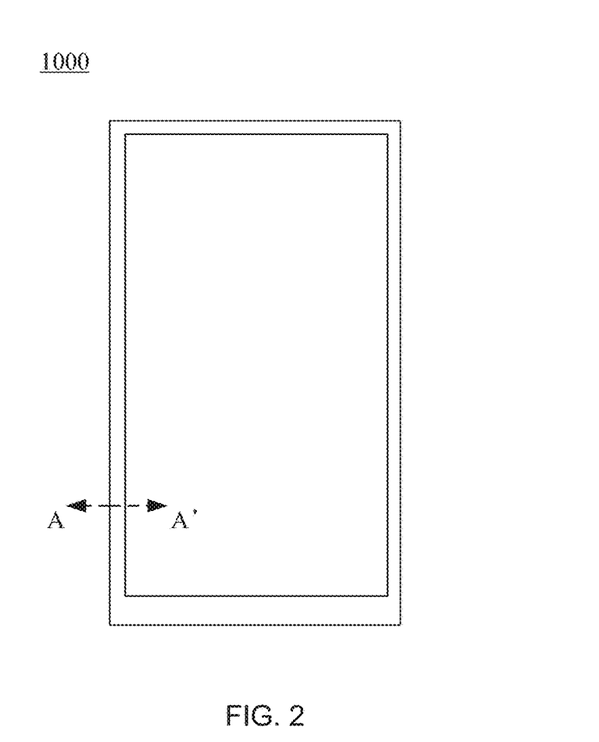
FIG. 2 is a structural diagram of a display device, in accordance with some embodiments of the present disclosure.

As shown in FIG. 2, the display device 1000 may be a small-to-medium-sized electronic device such as a tablet computer, a smart phone, a head-mounted display, an automobile navigation unit, a camera, a central information display (CID) provided in a vehicle, a watch-type electronic device or another wearable device, a personal digital assistant (PDA), a portable multimedia player (PMP) or a gaming machine, or may be a medium-to-large-sized electronic device such as a television, an external billboard, a monitor, a home appliance including a display screen, a personal computer or a laptop computer. The electronic device as described above may represent a simple example used for applying the display device, and a person of ordinary skill in the art may understood, without departing from the spirit and the scope of the present disclosure, that the display device may be another electronic device.

The display device may be a curved liquid crystal display (CLCD), a liquid crystal display (LCD), a mini light emitting diode (mini LED) display, a micro light emitting diode (Micro LED) display, etc.

The following embodiments of the present disclosure will be described by taking an example where the display device is the CLCD, but it will be understood that the display device is not limited to the LCD.

Figure 3:
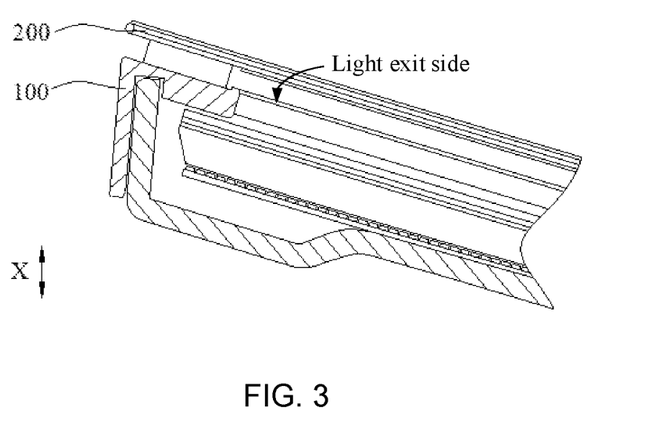
FIG. 3 is a sectional view taken along the line A-A' in FIG. 2.

As shown in FIGS. 2 to 3, the display device 1000 includes a backlight module 100 and a display panel 200 that are arranged in a first direction X. The display panel 200 is located on a light exit side of the backlight module 100. Based on monochromatic light emitted by the backlight module 100, the display panel 200 is capable of converting the monochromatic light into light of a plurality of colors and emitting the light of the plurality of colors, so as to display an image.

Figure 4:
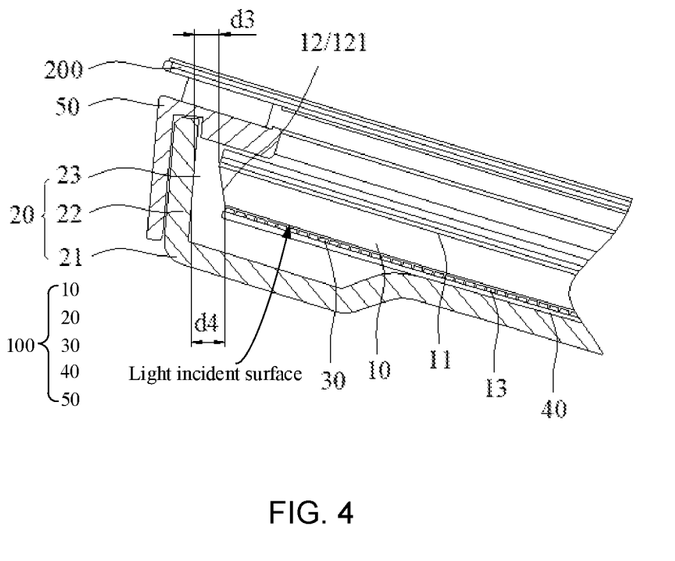
FIG. 4 is a sectional view of another display device, in accordance with some embodiments of the present disclosure.

As shown in FIG. 4, the backlight module 100 includes a backboard 20, a light source 30, an optical film, a mold frame 50 and a curved optical plate 10. The backboard 20 has an accommodation space 23, and the light source 30, the mold frame 50, the optical film and the curved optical plate 10 are all located in the accommodation space 23. According to a position of the light source 30, the backlight module 100 may be classified into a direct-lit backlight module and an edge-lit backlight module. In a case where the backlight module 100 is the direct-lit backlight module, the curved optical plate 10 is a diffuser plate, and the light source 30 is located on a side of the diffuser plate away from the display panel 200. In a case where the backlight module 100 is the edge-lit backlight module, the curved optical plate 10 is a light guide plate, and the light source at least partially surrounds a side surface of the light guide plate.

As shown in FIG. 4, the mold frame 50 may be connected to the backboard 20, which is used for supporting and protecting the curved optical plate 10 and the optical film in the backlight module 100. The mold frame 50 mainly has a function of supporting, and the mold frame 50 also has a function of maintaining a distance between the display panel 200 and the optical film.

The backboard 20 includes a bottom plate 21 and a surrounding plate 22 that extends from an edge of the bottom plate 21 to a side of the bottom plate 21, and the bottom plate 21 and the surrounding plate 22 define the accommodation space 23. The backboard 20 has a function of supporting the optical film in the backlight module 100 together with the rubber frame 50.

According to a form of the light, the light source 30 may be classified into three types of a linear light source, a point light source and an area light source. A light incident surface of the curved optical plate 10 faces the light source 30, which is used for receiving the light emitted by the light source 30 and uniformly emitting the light from a light exit surface 11 of the curved optical plate 10.

The optical film may include a film structure such as a brightness enhancement film located on the light exit surface of the curved optical plate 10, so as to improve a brightness and a uniformity of light emitted by the backlight module 100.

The following will be described considering the direct-lit backlight module as an example, and a working principle of the curved optical plate 10 (the light guide plate) in the edge-lit backlight module is similar to a working principle of the curved optical plate 10 (the diffuser plate) in the direct-lit backlight module, which will not be repeated here.

Figure 5:
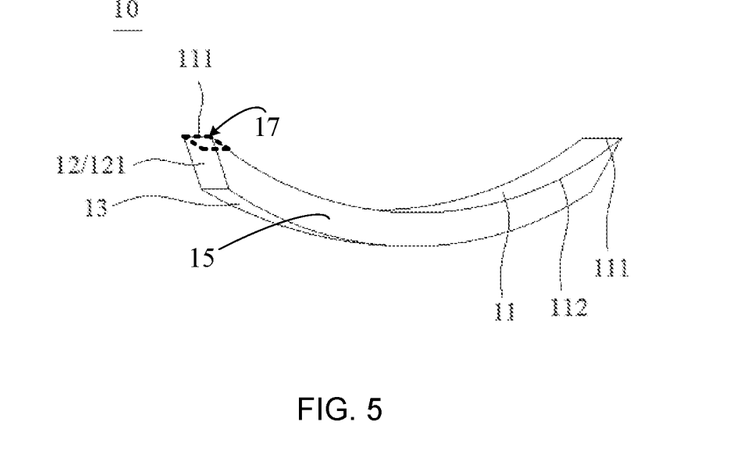
FIG. 5 is a perspective view of a curved optical plate, in accordance with some embodiments of the present disclosure.

For example, in the case where the backlight module 100 is the direct-lit backlight module, as shown in FIG. 4, the backlight module 100 includes the backboard 20, the light source 30 and the curved optical plate 10. The backboard 20 includes the bottom plate 21 and the surrounding plate 22 that extends from the edge of the bottom plate 21 to the side of the bottom plate 21, and the bottom plate 21 and the surrounding plate 22 define the accommodation space 23. The light source 30 is located in the accommodation space 23. The curved optical plate 10 is located in the accommodation space 23, and the light incident surface of the curved optical plate 10 faces the light source 30. As shown in FIG. 5, the curved optical plate 10 includes the curved light exit surface 11 and first side surfaces 12 respectively connected to uncurved edges 111 of the light exit surface 11. At least one first side surface 12 includes a first surface 121, and the first surface 121 extends towards an interior 15 of the curved optical plate 10.

With continued reference to FIGS. 4 and 5, the curved optical plate 10 is located in the accommodation space 23. The light incident surface of the curved optical plate 10 faces the bottom plate 21, the light exit surface 11 and the light incident surface of the curved optical plate 10 are opposite to each other, and the light exit surface 11 protrudes towards the bottom plate 21. A first side surface 12 is connected between an uncurved edge 111 of the light exit surface 11 and the light incident surface. The at least one first side surface 12 includes the first surface 121, and the first surface 121 extends towards the interior 15 of the curved optical plate 10. That is, the first surface 121 extends towards a direction away from the surrounding plate 22. The light source 30 is located between the light incident surface and the bottom plate 21, and faces the light incident surface. The curved optical plate 10 further includes a bottom surface 13 opposite to the light exit surface 11. It will be noted that the bottom surface 13 is the light incident surface and is opposite to the light source 30.

In the example shown in FIG. 1, an edge of the curved optical plate 10' expands outwards relative to the light exit surface 11' of the curved optical plate 10'. When the curved optical plate 10' expands at the high temperature, an end of the curved optical plate 10' expands mainly towards a surrounding plate 22. Therefore, a space is provided between the surrounding plate 22 and the end of the curved optical plate 10', so as to avoid a damage caused by which the curved optical plate 10' expands to be in contact with the surrounding plate 22. A maximum distance between the surrounding plate 22 and the curved optical plate 10' is represented as d1, and a minimum distance between the two is represented as d2. Thus, a length, expanding outwards relative to the light exit surface 11' of the curved optical plate 10', of the edge of the curved optical plate 10' is equal to a difference between the maximum distance d1' and the minimum distance d2'.

Therefore, in the example shown in FIG. 1, in addition to the space for the expansion, the distance between the surrounding plate 22 and the curved optical plate 10' is set for further providing a space for accommodating the edge of the curved optical plate 10' expanding outwards relative to the light exit surface 11' of the curved optical plate 10', so that a problem that the bezel of the display device 1000 is relatively wide is prone to occur.

In the embodiments of the present disclosure, an end of the first surface 121 of the curved optical plate 10 is connected to the uncurved edge 111 of the light exit surface 11, and the other end of the first surface 121 is capable of extending towards the direction away from the surrounding plate 22. That is, an edge of the curved optical plate 10 is concave relative to the light exit surface 11 of the curved optical plate 10. Therefore, it is not necessary to provide a space, used for accommodating an edge of the curved optical plate 10 expanding outwards relative to the light exit surface 11 of the curved optical plate 10, between the surrounding plate 22 and the curved optical plate 10. In this way, a distance between an edge of the light exit surface 11 and the surrounding plate 22 may be reduced, which facilitates an achievement of the narrow bezel of the display device 1000, so as to improve a screen-to-body ratio of the display device 1000.

In some embodiments, an orthographic projection of at least part of the first surface(s) 121 on the bottom plate 21 is at least partially located within an orthographic projection of the light exit surface 11 on the bottom plate 21.

The orthographic projection of the at least part of the first surface(s) 121 on the bottom plate 21 may be arranged in two cases. In a case, all of the orthographic projection of the at least part of the first surface(s) 121 on the bottom plate 21 is all located within the orthographic projection of the light exit surface 11 on the bottom plate 21. In another case, a part of the orthographic projection of the at least part of the first surface(s) 121 on the bottom plate 21 is located within the orthographic projection of the light exit surface 11 on the bottom plate 21, and the other part of orthographic projection of all the first surface(s) 121 on the bottom plate 21 is located outside the orthographic projection of the light exit surface 11 on the bottom plate 21. Compared with FIG. 1 in which orthographic projections of all first side surfaces 12' on the bottom plate 21 are located within an orthographic projection of the light exit surface 11' of the curved optical plate 10' on the bottom plate 21, in the embodiments of the present disclosure, a distance that the first side surface 12 expands outwards may be reduced. As a result, the distance between the light exit surface 11 of the curved optical plate 10 and the surrounding plate 22 is reduced, which facilitates the achievement of the narrow bezel of the display device 1000.

As shown in FIG. 4, in some embodiments, the bottom surface 13 of the curved optical plate 10 is opposite to the light exit surface 11, and an orthographic projection of the bottom surface 13 on the bottom plate 21 is located within the orthographic projection of the light exit surface 11 on the bottom plate 21.

As shown in FIG. 1, in a case where the curved optical plate 10' protrudes toward the bottom surface 13', an area of the bottom surface 13' is greater than an area of the light exit surface 11', and an area of an orthographic projection of the bottom surface 13' on the bottom plate 21 is actually greater than an area of the orthographic projection of the light exit surface 11' on the bottom plate 21. In these embodiments, as shown in FIG. 4, the first surface 121 extends towards the interior 15 of the curved optical plate 10, so 5 that the orthographic projection of the bottom surface 13 on the bottom plate 21 is located within the orthographic projection of the light exit surface 11 on the bottom plate 21. As a result, a size of a side, proximate to the bottom plate 21, of the curved optical plate 10 may be reduced, thereby facilitating the achievement of the narrow bezel of the display device 1000.

As shown in FIG. 4, in the case where the backlight module 100 is the direct-lit backlight module, the curved optical plate 10 is a diffuser plate; the backlight module 100 further includes a reflective film 40, the reflective film 40 is located on a surface of the diffuser plate facing the bottom surface 21, and the light source 30 is located between the reflective film 40 and the diffuser plate.

Figure 6:
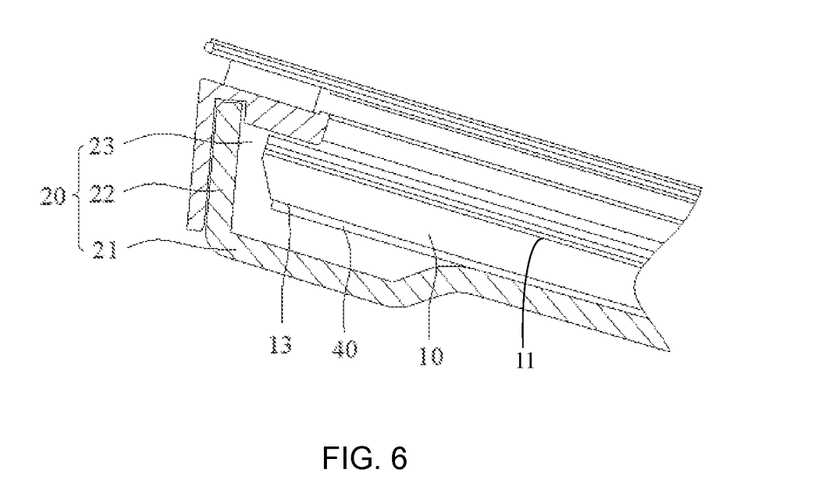
FIG. 6 is a sectional view of yet another display device, in accordance with some embodiments of the present disclosure.

As shown in FIG. 6, in the case where the backlight module 100 is the edge-lit backlight module, the curved optical plate 10 is a light guide plate, and the light source is located between the light guide plate and the surrounding plate 22; the backlight module 100 further includes a reflective film 40, the reflective film 40 covers the bottom surface 13 of the light guide plate, and an area of the reflective film 40 is less than an area of the light exit surface 11.

An area of the bottom surface 13 of the curved optical plate 10 is reduced by extending the first surface 121 towards the interior, and the reflective film 40 is used for reflecting light back to the bottom surface 13 of the curved optical plate 10. Thus, it is possible to reduce the area of the reflective film 40, so that a probability of a damage cause by which the reflective film 40 is in contact with the surrounding plate 22 due to a relatively large area of the reflective film 40 may be reduced.

In some embodiments, as shown in FIGS. 4 and 5, the curved optical plate 10 includes the curved light exit surface 11 and the first side surfaces 12. As shown in FIG. 5, the curved light exit surface 11 includes at least one curved edge 112 and at least one uncurved edge 111. The first side surface 12 is connected to the uncurved edge 111 of the light exit surface 11. The at least one first side surface 12 includes the first surface 121, and the first surface 121 extends towards the interior 15 of the curved optical plate 10. For example, the first surface 121 extends towards the direction away from the surrounding plate 22.

In some examples, the light exit surface 11 of the curved optical plate 10 may be in a shape of a quadrilateral. In this case, the light exit surface 11 may include two curved edges 112 and two uncurved edges 111, the two uncurved edges 111 are opposite to each other, and each uncurved edge 111 may be connected to a first side surface 12. At least one first side surface 12 includes a first surface 121. As for the number of first surfaces 121 that are provided, it will be understood that one of the two first side surfaces 12 includes a first surface 121, or the two first side surfaces 12 each include a first surface 121. As for an area of the first surface 121, the area of the first surface 121 may be equal to an area of the first side surface 12 (for example, the first surface 121 is the first side surface 12); alternatively, the area of the first surface 121 may be less than the area of the first side surface 12 (for example, the first surface 121 is a portion of the first side surface 12).

For example, in a case where the first surface 121 is the first side surface 12 (the first side surface 12 as shown in FIG. 5), the first surface 121 extends from the uncurved edge 111 of the light exit surface 11 towards the direction away from the surrounding plate 22. That is, the first surface 121 extends from the uncurved edge 111 of the light exit surface 11 towards the interior 15 of the curved optical plate 10.

In the example shown in FIG. 1, the backlight module is a direct-lit backlight module. The maximum distance between the curved optical plate 10' and the surrounding plate 22 is the distance d1 between the edge of the light exit surface 11' of the curved optical plate 10' and the surrounding plate 22, and the minimum distance between the curved optical plate 10' and the surrounding plate 22 is the distance (i.e., the distance d2 between the bottom surface 13' and the backboard 20) between an edge of a light incident surface of the curved optical plate 10' and the surrounding plate 22. As shown in FIG. 4, in the embodiments of the present disclosure, a minimum distance between the curved optical plate 10 and the surrounding plate 22 is the distance d3 between the edge of the light exit surface 11 of the curved optical plate 10 and the surrounding plate 22; a maximum distance between the curved optical plate 10 and the surrounding plate 22 is a distance d4 between an edge of the bottom surface 13 (the light incident surface) of the curved optical plate 10 and the surrounding plate 22.

It can be seen that the minimum distance d3 between the curved optical plate 10 and the surrounding plate 22 in FIG. 4 is equal to the maximum distance d1 between the curved optical plate 10' and the surrounding plate 22 in FIG. 1. The distance, that is maintained to be equal to the distance d2, between the curved optical plate 10 and the surrounding plate 22 may satisfy the requirement for the expansion, so that it is possible to actually shorten the distance between the light exit surface of the curved optical plate 10 and the surrounding plate 22 in FIG. 4 (for example, the distance is actually shortened by a distance of (d1−d2)). As a result, a distance between the bezel of the display device 1000 and the light exit surface 11 may be reduced, which facilitates the achievement of the narrow bezel of the display device 1000.

It will be understood that, in the above embodiments, only a case where the single first side surface 12 of the curved optical plate 10 is provided with the first surface 121 is described. In a case where the two first side surfaces 12 are each provided with the first surface 121, a distance, in the curved optical plate 10, between each of the two uncurved edges 111 and a respective surrounding plate 22 may be reduced, so as to achieve narrow bezels on two sides. As a result, the screen-to-body ratio is further improved.

The curved optical plate 10 itself has a certain thickness, and bending degrees of different curved optical plates 10 are different. Thus, when the curved optical plate 10 is bent at a different angle, a degree to which the edge of the curved optical plate 10 protrudes relative to the light exit surface 11 is different. Correspondingly, in curved optical plates 10 with different degrees of bending, degrees to which the respective first surfaces 121 extend, towards the direction away from the surrounding plate 22, is different.

Figure 7:
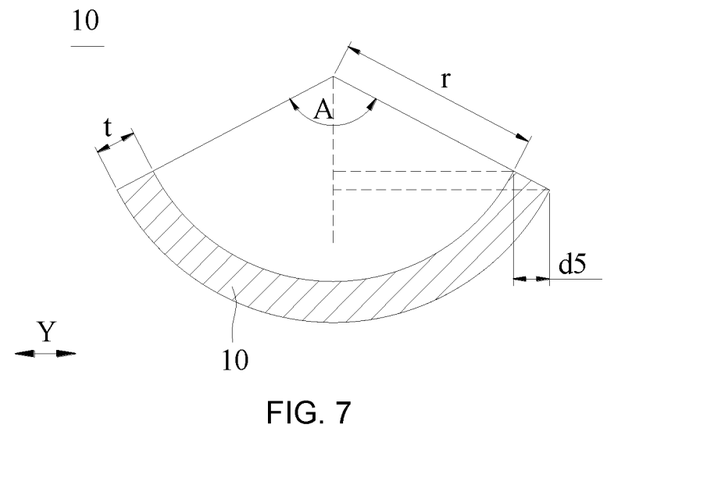
FIG. 7 is a sectional view of a curved optical plate, in accordance with some embodiments of the present disclosure.

For example, as shown in FIG. 7, a thickness of the curved optical plate 10 is represented as t; the curved optical plate 10 is a cambered plate, a central angle of the cambered plate is represented as A, a radius of the cambered plate is represented as r, and a component of the first side surface 12 in a second direction Y is represented as d5. Based on the above parameters, it may be obtained that:

$$d5 = (r + \frac{t}{2})\sin\frac{A}{2} - (r - \frac{t}{2})\sin\frac{A}{2}.$$

The formula may be simplified as:

$$d5 = t\sin\frac{A}{2}.$$

It can be seen that, in a case where the central angle of the cambered plate varies, the distance d5 varies accordingly, and thus a degree to which the first side surface 12 extends towards the direction away from the surrounding plate 22 varies.

Figure 8:
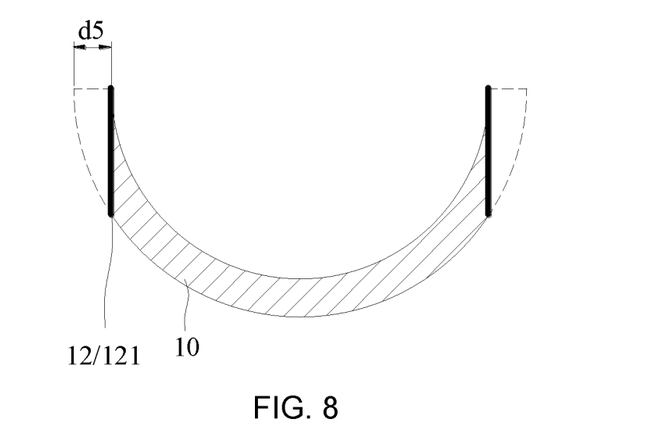
FIG. 8 is a sectional view of another curved optical plate, in accordance with some embodiments of the present disclosure.

In some examples, as for the curved optical plate 10 shown in FIG. 8, in a case where the central angle A is 180°, a distance d5 of outward expansion of an expanding portion (represented by the dashed line in FIG. 8) of the curved optical plate 10 in the related art is the largest. In this case, the distance d5 is equal to the thickness t of the curved optical plate 10. The first side surface 12 of the curved optical plate 10 provided in the embodiments of the present disclosure includes the first surface 121 (represented by the bold solid line in FIG. 8). In this case, the curved optical plate 10 does not expand outwards relative to the light exit surface 11. In this way, in the curved optical plate 10 provided in the embodiments of the present disclosure, the distance between the light exit surface 11 of the curved optical plate 10 and the surrounding plate 22 may be shortened, which facilitates the narrow bezel of the display device 1000.

Figure 9:
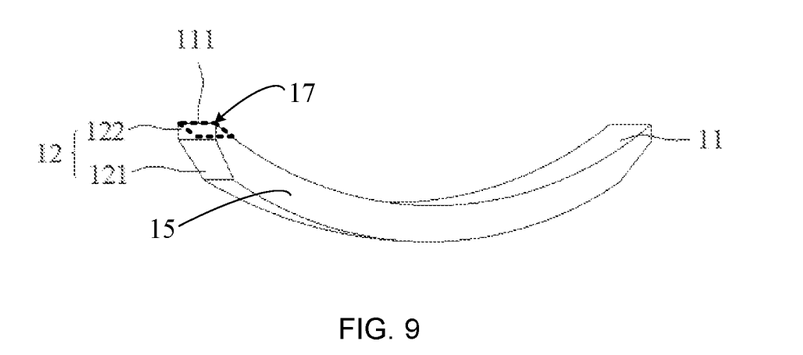
FIG. 9 is a perspective view of another curved optical plate, in accordance with some embodiments of the present disclosure.

For example, as shown in FIG. 9, at least one first side surface 12 further includes a second surface 122, and the second surface 122 is connected to the first surface 121 and the light exit surface 11. In this way, the first surface 121 serves as a portion of the first side surface 12, and the second surface 122 serves as another portion of the first side surface 12, so that the shape of the first side surface 12 changes. As a result, it may be possible to improve the adaptability of the curved optical plate 10 in an inner space of a different backlight module.

The light exit surface 11 includes an uncurved edge 111 connected to the second surface 122, and a tangent plane 17 where the edge is located may be perpendicular to the second surface 122. Of course, the second surface 122 may extend towards the direction away from the surrounding plate 22, which may be understood that the second surface 122 extends toward the interior 15 of the curved optical plate 10. As shown in FIG. 9, an included angle between the second surface 122 and the tangent plane 17 where the uncurved edge 111 is located is an acute angle. In this way, a length of the light guide plate in the direction away from the surrounding plate 22 may be further reduced.

Figure 10:
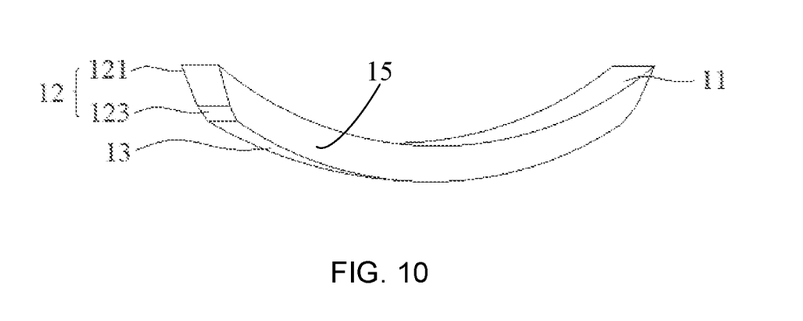
FIG. 10 is a perspective view of yet another curved optical plate, in accordance with some embodiments of the present disclosure.

In some embodiments, as shown in FIG. 10, at least one first side surface 12 further includes a third surface 123, and the third surface 123 is connected to the bottom surface 13 and the first surface 121. For example, the first surface 121 is directly connected to the edge of the light exit surface 11, and the third surface 123 is disposed between the first surface 121 and the bottom surface 13. In this way, it may be possible to improve the variability of the shape of the first side surface 12, so as to improve the adaptability of the curved optical plate 10 in the inner space of the different backlight module.

It will be understood that, the third surface 123 may extend towards the direction away from the surrounding plate 22, which may be understood that the third surface 123 extends toward the interior 15 of the curved optical plate 10. In this way, the length of the light guide plate in the direction away from the surrounding plate 22 may be further reduced.

Figure 11:
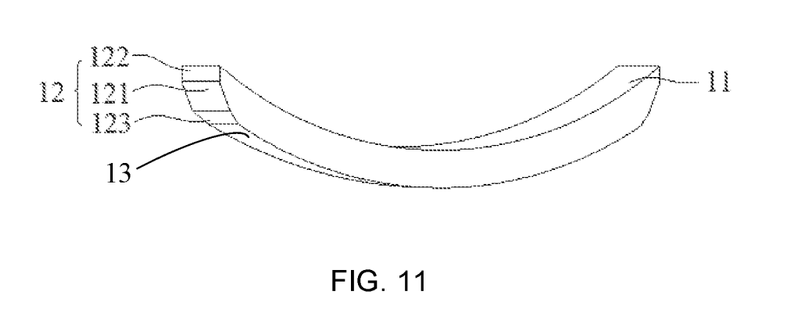
FIG. 11 is a perspective view of yet another curved optical plate, in accordance with some embodiments of the present disclosure.

In addition, in some embodiments, at least one first side surface 12 may include both the second surface 122 and the third surface 123. As shown in FIG. 11, the edge of the light exit surface 11, the second surface 122, the first surface 121, the third surface 123 and the bottom surface 13 are connected in sequence, so as to further improve the variability of the shape of the first side surface 12. A positional relationship among the second surface 122, the first surface 121, the third surface 123 and the bottom surface 13 may be adjusted according to actual situations, which will not be described here.

In some embodiments, the first surface 121 may be in a shape of a plane or a curved surface.

Figure 12:
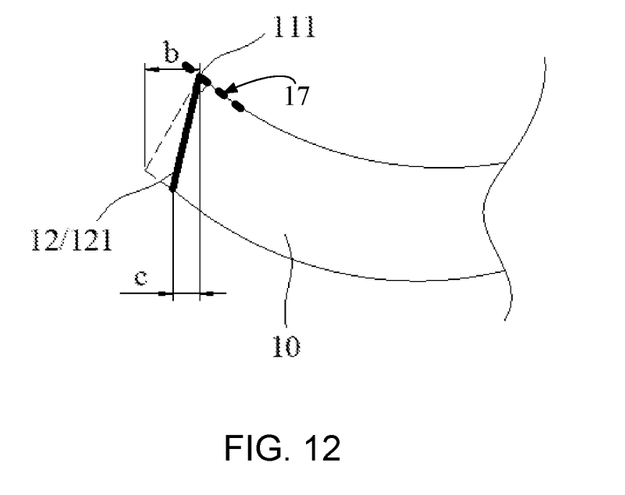
FIG. 12 is a partial structural diagram of a curved optical plate, in accordance with some embodiments of the present disclosure.

In some examples, the first surface 121 is the plane, and the first side surface 12 is the first surface 121. With reference to FIGS. 1 and 12, in the related art, an included angle between the first surface 121' and a tangent plane where an uncurved edge 111' is located may be 90°. In this case, a distance between an end of the first surface 121' (represented by the dashed line in FIG. 12) away from the uncurved edge 111' and the uncurved edge 111' may be represented as b. In the embodiments shown in FIGS. 4, 5 and 12, an included angle between the first surface 121 (represented by the bold solid line in FIG. 12) and a tangent plane 17 where an uncurved edge 111 connected to the first surface 121 is located is less than 90°. In this case, a distance between an end of the first surface 121 away from the uncurved edge 111 and the uncurved edge 111 may be represented as c; where c is less than b. In this way, in a case where the included angle between the first surface 121 and the tangent plane where the uncurved edge 111 is located is less than 90°, it is possible to shorten an expanding distance of the curved optical plate 10 relative to the light exit surface 11 on a basis of changing a shape of the first surface 121.

Figure 19:
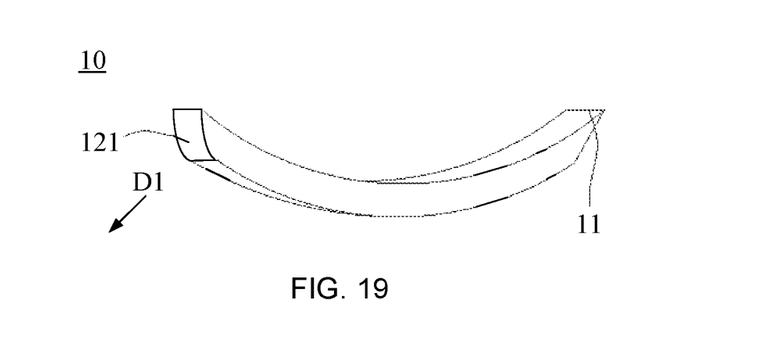
FIG. 19 is a perspective view of yet another curved optical plate, in accordance with some embodiments of the present disclosure.
Figure 20:
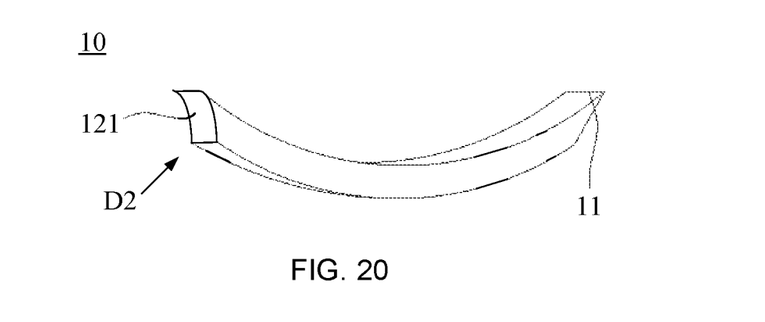
FIG. 20 is a perspective view of yet another curved optical plate, in accordance with some embodiments of the present disclosure.

For example, in a case where the first surface 121 is the curved surface, as shown in FIG. 19, the curved surface may protrude towards a direction D1 away from the light exit surface 11; alternatively, as shown in FIG. 20, the curved surface may protrude towards a direction D2 proximate to the light exit surface 11. In this way, it is possible to change a shape of the edge of the curved optical plate 10 on a basis of not affecting the usage of the curved optical plate 10.

Figure 13:
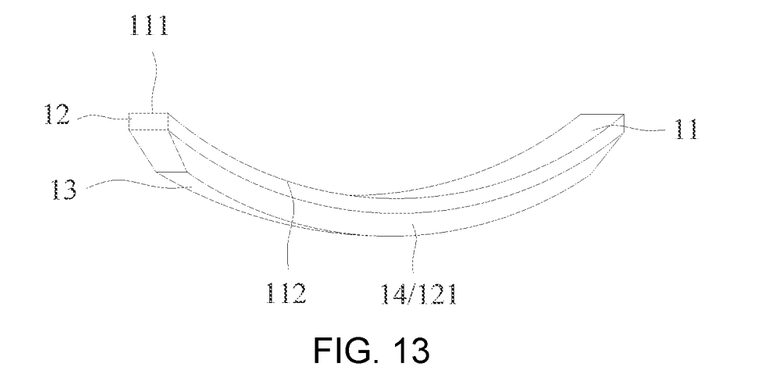
FIG. 13 is a perspective view of yet another curved optical plate, in accordance with some embodiments of the present disclosure.

In some embodiments, as shown in FIG. 13, the curved optical plate 10 further includes second side surface(s) 14 each connected to a curved edge 112 of the light exit surface 11, and at least one second side surface 14 includes a first surface 121.

For example, referring to FIG. 13, the second side surface 14 includes the first surface 121. Of course, there may be two second side surfaces 14, and the two second side surfaces 14 are opposite to each other. The two second side surfaces 14 may be each provided with a first surface 121.

In a case where the second side surface 14 is provided with the first surface 121, a relationship between the first surface 121 and the second side surface 14 is similar to a relationship between the first surface 121 of the first side surface 12 and the first side surface 12. For example, the first surface 121 is the second side surface 14; alternatively, the first surface 121 is a portion of the second side surface 14.

The second side surface 14 includes the first surface 121, which may reduce a volume of a side, that is proximate to the bottom plate 21, of the light exit surface 11 of the curved optical plate 10, so as to optimize the inner space of the display module and facilitate a structural arrangement (for example, an arrangement of signal lines) on the side, that is proximate to the bottom plate 21, of the light exit surface 11 of the curved optical plate 10.

It will be understood that, in addition to the first surface 121, the second side surface 14 may further include a second surface 122 and a third surface 123. As for a shape of the second side surface 14, reference may be made to the shape of the first side surface 12, which will not be listed here.

In some embodiments, as shown in FIGS. 6 and 13, the first side surface 12 is the light incident surface, and/or the second side surface 14 is the light incident surface; the light incident surface is opposite to the light source 30. In this case, the backlight module 100 may be the edge-lit backlight module.

It will be noted that a description that the first side surface 12 is the light incident surface and/or the second side surface 14 is the light incident surface includes three cases, which are a case where the first side surface 12 is the light incident surface, another case where the second side surface 14 is the light incident surface and yet another case where the first side surface 12 and the second side surface 14 are both the light incident surface.

In this way, a position of the light incident surface, and position(s) and the number of provided light source(s) 30 may be determined according to actual situations, so as to improve flexibility of a design of the inner space of the backlight module 100.

In summary, the first side surface 12 of the curved optical plate 10 has the first surface 121 extending towards the interior, which may reduce or even eliminate the expanding distance of the curved optical plate 10 relative to the light exit surface 11, so as to reduce the distance between the edge of the light exit surface 11 and the surrounding plate 22. Thus, it is possible to facilitate the achievement of the narrow bezel of the display device 1000, so that the screen-to-body ratio of the display device 1000 is further improved.

Figure 14:
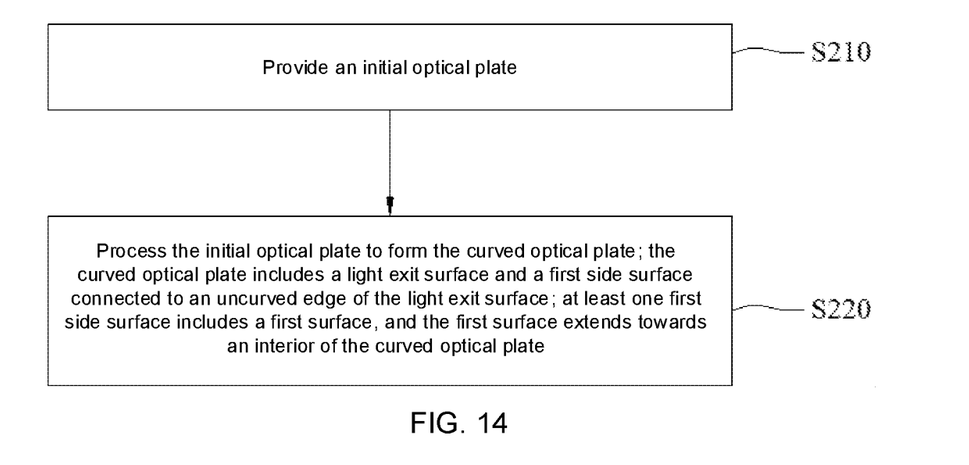
FIG. 14 is a flow diagram of a method of manufacturing a curved optical plate, in accordance with some embodiments of the present disclosure.

FIG. 14 is a flow diagram of a method of manufacturing a curved optical plate 10 provided in some embodiments of the present disclosure.

Some embodiments of the present disclosure provide a method of manufacturing a curved optical plate 10, as shown in FIG. 14, the method of manufacturing the curved optical plate 10 includes the following steps.

In S210, an initial optical plate is provided.

In S220, the initial optical plate is processed to form the curved optical plate 10. The curved optical plate 10 includes a light exit surface 11, and a first side surface 12 connected to an uncurved edge 111 of the light exit surface 11. At least one first side surface 12 includes a first surface 121, and the first surface 121 extends towards an interior of the curved optical plate 10.

The initial optical plate before processing may be presented in a state of a curved plate or a state of a planar plate. Whether the initial optical plate is in the state of the planar plate or the state of the curved plate, a subsequent formation of the curved optical plate 10 will not be affected.

Figure 15:
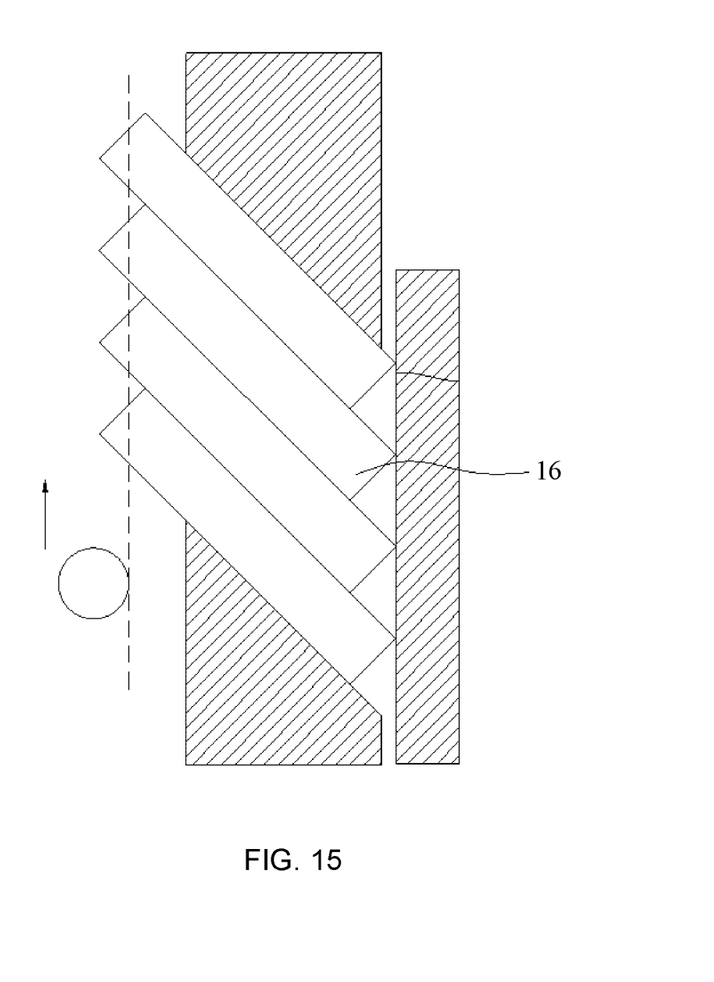
FIG. 15 is a diagram showing a structure of which a curved optical plate is placed in a processing device that is in a non-processing state, in accordance with some embodiments of the present disclosure.
Figure 16:
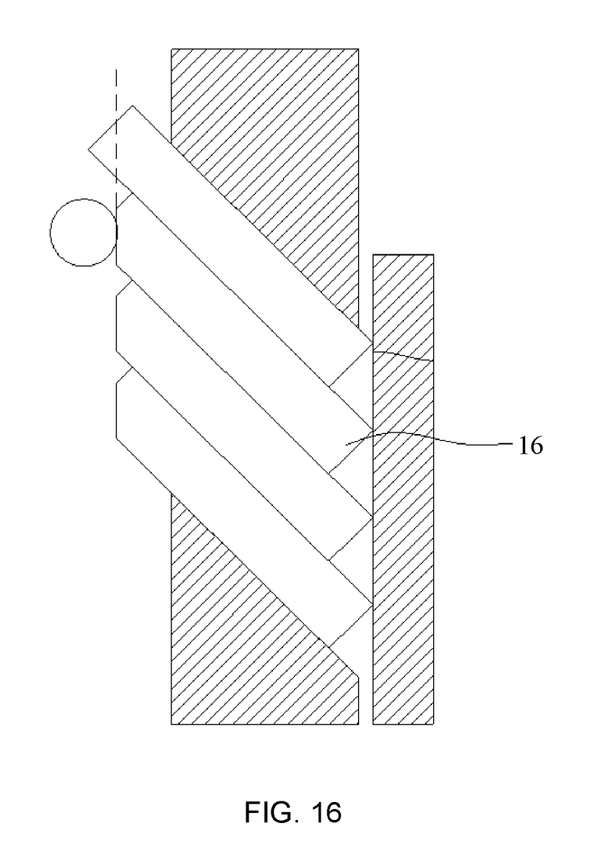
FIG. 16 is a diagram showing a structure of which a curved optical plate is placed in a processing device that is in a processing state, in accordance with some embodiments of the present disclosure.

When the initial optical plate is processed, the initial optical plate may be placed in a processing position of a processing device such as a metallurgical tool. The initial optical plate is fixed by the processing position. There may be a single initial optical plate or a plurality of initial optical plates placed in the processing position. In a case where the plurality of initial optical plates 16 are all placed in the processing position, the plurality of initial optical plates 16 may be placed in a stacked manner (as shown in FIGS. 15 and 16); there is a distance between portions, that are to be processed, of two adjacent initial optical plates, and orientations of portions, that are to be processed, of all the initial optical plates are consistent. In this way, the plurality of initial optical plates may be processed simultaneously.

In some examples, a portion, that is to be processed, of an initial optical plate in the state of the curved plate may be cut by using a cutting mechanism to form the first surface 121, thereby forming the curved optical plate 10. In this way, the shaped curved optical plate 10 includes the concave light exit surface 11 and the first side surface 12 connected to the uncurved edge 111 of the light exit surface 11; the first side surface 12 includes the first surface 121, and the first surface 121 extends toward the interior of the curved optical plate 10.

In the manufacturing method provided in some embodiments of the present disclosure, the curved optical plate 10 may be formed by processing the initial optical plate by using a tool such as the metallurgical tool, and there is no need to polish processed portions, so that processing steps are simplified, and a manufacturing efficiency of the curved optical plate 10 is improved.

It will be noted that, in a case where the initial optical plate before processing is in the state of the planar plate or the state of the curved plate, a subsequent processing manner of the initial optical plate is different. For example, the initial optical plate in the state of the planar plate needs to be bent subsequently; the initial optical plate in the state of the curved plate does not need to be bent subsequently.

Figure 17:
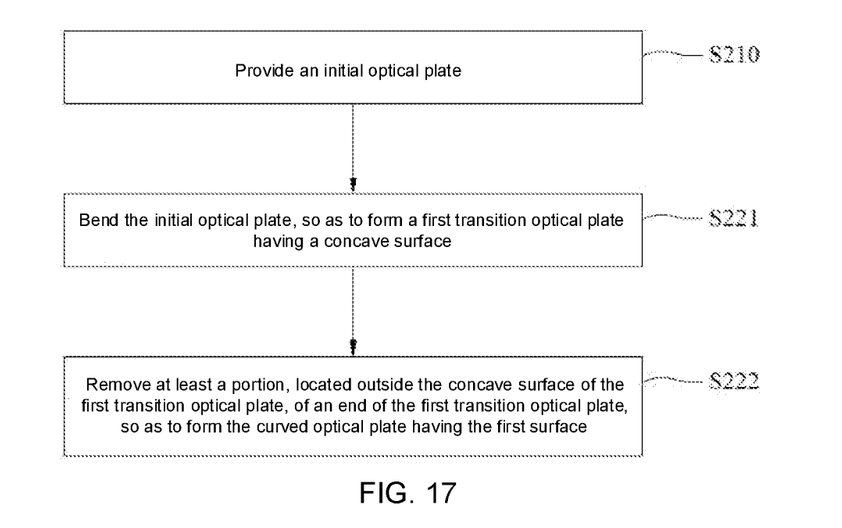
FIG. 17 is a flow diagram of another method of manufacturing a curved optical plate, in accordance with some embodiments of the present disclosure.

As shown in FIG. 17, in some embodiments, in a case where the initial optical plate before processing is in the state of the planar plate, S220 may include S221 and S222.

In S221, the initial optical plate is bent, so as to form a first transition optical plate having a concave surface.

In S222, at least a portion, located outside the concave surface of the first transition optical plate, of an end of the first transition optical plate is removed, so as to form the curved optical plate 10 having the first surface.

The method includes the following steps. Firstly, a bending processing is performed on the initial optical plate, so that the bent initial optical plate forms the first transition optical plate having the concave surface. That is, the first transition optical plate in a state of a curved plate is obtained. Next, the first transition optical plate in the state of the curved plate may be placed in the metallurgical tool. Subsequently, the end of the first transition optical plate may be partially removed by using the cutting mechanism, and the removed portion is caused to be located outside the concave surface of the first transition optical plate (i.e., located on a side of the first transition optical plate away from the light exit surface 11), so that the first surface 121 is formed. In this way, the curved optical plate 10 may be obtained.

The bending processing is firstly performed on the initial optical plate, so that the first transition optical plate at a different bending angle may be cut according to a bending degree of the first transition optical plate. As a result, an accuracy of a respective cut portion is improved, so that the formed curved optical plate 10 may be more consistent with the preset curved optical plate 10.

Figure 18:
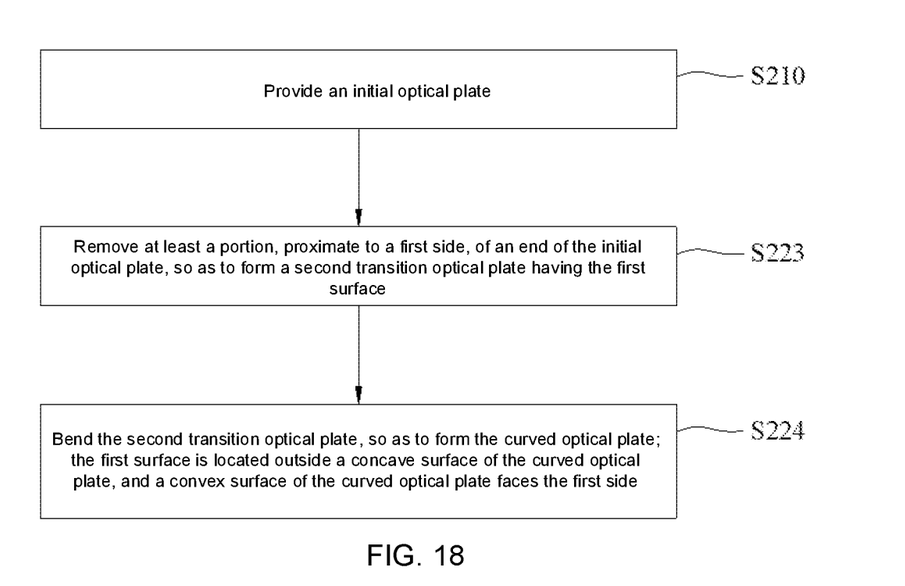
FIG. 18 is a flow diagram of yet another method of manufacturing a curved optical plate, in accordance with some embodiments of the present disclosure.

For example, as shown in FIG. 18, in the case where the initial optical plate before processing is in the state of the planar plate, S220 may include S223 and S224.

In S223, at least a portion, proximate to a first side, of an end of the initial optical plate is removed, so as to form a second transition optical plate having the first surface.

In S224, the second transition optical plate is bent, so as to form the curved optical plate 10; the first surface is located outside a concave surface of the curved optical plate, and a convex surface of the curved optical plate faces the first side.

Firstly, the portion of the end of the initial optical plate may be cut by using the cutting mechanism. The portion to be cut is located on a side of the end proximate to the first side; after the initial optical plate is cut, the second transition optical plate having the first surface 121 may be formed. Subsequently, the second transition optical plate may be bent, so that the second transition optical plate protrudes toward a second side opposite to the first side. Thus, the light exit surface having the concave surface is formed, the convex surface of the curved optical plate faces the first side, and the first surface is located outside the concave surface. In this way, the curved optical plate 10 may be formed.

The initial optical plate is cut and bent in sequence, and a bending degree of the initial optical plate may be adjusted according to a cutting amount. It will be understood that the above two manufacturing methods may be selected according to actual situations.

In addition to using a tool such as the cutting mechanism, the curved optical plate 10 may be manufactured by a one-piece molding manner. For example, the curved optical plate 10 is manufactured by using an injection molding part.

Compared with a series of processings including providing the initial optical plate, and cutting and bending the initial optical plate, the one-piece molding manner may further accelerate a manufacturing speed of the curved optical plate 10. A specific method of manufacturing the curved optical plate 10 is not limited to the above manners, which will not be listed here.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A backlight module, comprising:
    a backboard including a bottom plate and a surrounding plate that extends from an edge of the bottom plate to a side of the bottom plate; the bottom plate and the surrounding plate defining an accommodation space;
    a light source located in the accommodation space; and
    a curved optical plate located in the accommodation space; wherein a light incident surface of the curved optical plate faces the light source; the curved optical plate includes a curved light exit surface including at least one curved edge and at least one uncurved edge, and at least one first side surface connected to the uncurved edge of the light exit surface; a first side surface of the at least one first side surface includes a first surface, the first surface extends towards an interior of the curved optical plate, and an orthographic projection of the first surface on the bottom plate is at least partially located within an orthographic projection of the light exit surface on the bottom plate.

2. The backlight module according to claim 1, wherein the curved optical plate further includes a bottom surface; the bottom surface of the curved optical plate is opposite to the light exit surface, and an orthographic projection of the bottom surface on the bottom plate is located within an orthographic projection of the light exit surface on the bottom plate.

3. The backlight module according to claim 1, wherein the curved optical plate further includes at least one second side surface connected to the curved edge of the light exit surface, and a second side surface of the at least one second side surface includes another first surface.

4. The backlight module according to claim 3, wherein the backlight module is an edge-lit backlight module; the light source is located between the curved optical plate and the surrounding plate;
    the first side surface is the light incident surface, and/or the second side surface is the light incident surface; the light incident surface is opposite to the light source.

5. The backlight module according to claim 4, wherein the curved optical plate is a light guide plate;
    the backlight module further comprises a reflective film; wherein the reflective film covers the bottom surface of the light guide plate, and an area of the reflective film is less than an area of the light exit surface.

6. The backlight module according to claim 1, wherein the backlight module is a direct-lit backlight module, the curved optical plate is a diffuser plate; the light source is located between the curved optical plate and the bottom plate;
    the curved optical plate further includes a bottom surface opposite to the light exit surface, and the bottom surface is the light incident surface and is opposite to the light source.

7. A display device, comprising a backlight module and a display panel located on a light exit side of the backlight module; wherein the backlight module is the backlight module according to claim 1.

8. The backlight module according to claim 1, wherein the first surface is in a shape of a plane, and an included angle between the first surface and a tangent plane where an uncurved edge connected to the first side surface is located is less than 90°.

9. The backlight module according to claim 1, wherein the first surface is in a shape of a curved surface; the curved surface protrudes towards a direction away from the light exit surface, or the curved surface protrudes towards a direction proximate to the light exit surface.

10. The backlight module according to claim 1, wherein the first side surface further includes a second surface, and the second surface is connected to the first surface and the light exit surface.

11. The backlight module according to claim 10, wherein the second surface extends toward the interior of the curved optical plate.

12. The backlight module according to claim 1, wherein the curved optical plate further includes a bottom surface, the bottom surface being of the curved optical plate is opposite to the light exit surface; the first side surface further includes a third surface, and the third surface is connected to the bottom surface and the first surface.

13. The backlight module according to claim 12, wherein the third surface extends toward the interior of the curved optical plate.

* * * * *